United States Patent
Hisamoto et al.

(10) Patent No.: US 6,960,897 B2
(45) Date of Patent: Nov. 1, 2005

(54) APPARATUS AND METHOD FOR PROTECTING STARTER FOR ENGINE AGAINST OVERHEATING

(75) Inventors: Motoi Hisamoto, Tokyo (JP); Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 494 days.

(21) Appl. No.: 09/969,728

(22) Filed: Oct. 4, 2001

(65) Prior Publication Data

US 2002/0141122 A1 Oct. 3, 2002

(30) Foreign Application Priority Data

Apr. 3, 2001 (JP) ........................ 2001-104290

(51) Int. Cl.⁷ .............................. H02P 7/00; H02H 5/04
(52) U.S. Cl. ........................................ 318/434; 361/25
(58) Field of Search ........................ 361/23–29, 33, 361/103; 318/434, 471, 472

(56) References Cited

U.S. PATENT DOCUMENTS

| | | | | |
|---|---|---|---|---|
| 4,061,949 A | * | 12/1977 | Griffis ........................ 318/154 |
| 4,542,324 A | * | 9/1985 | Leuthen ....................... 318/798 |
| 4,547,826 A | * | 10/1985 | Premerlani ................... 361/25 |
| 4,611,682 A | * | 9/1986 | Yasuda et al. .............. 180/446 |
| 4,977,507 A | * | 12/1990 | Matsuoka et al. ............ 701/43 |
| 5,156,005 A | * | 10/1992 | Redlich ............................ 62/6 |
| 5,283,708 A | * | 2/1994 | Waltz ......................... 361/93.8 |
| 5,488,281 A | * | 1/1996 | Unsworth et al. .......... 318/806 |
| 5,510,687 A | * | 4/1996 | Ursworth et al. ........... 318/727 |
| 5,583,404 A | * | 12/1996 | Karwath et al. ............ 318/254 |
| 5,744,921 A | * | 4/1998 | Makaran ..................... 318/254 |
| 5,744,927 A | * | 4/1998 | Hayashida .................. 318/599 |
| 5,818,178 A | * | 10/1998 | Marumoto et al. ......... 318/254 |
| 6,054,826 A | * | 4/2000 | Murakami et al. .......... 318/471 |
| 6,172,860 B1 | * | 1/2001 | Yoshimizu et al. ........... 361/25 |

FOREIGN PATENT DOCUMENTS

JP  2000-205092  7/2000

* cited by examiner

*Primary Examiner*—Jonathan Salata
(74) *Attorney, Agent, or Firm*—Sughrue Mion, PLLC

(57) ABSTRACT

A method and an apparatus for protecting an engine starter of a motor vehicle against overheating with enhanced reliability by controlling turn-on/off of the starter in dependence on a conducting current of the starter, a starter temperature and an ambient temperature. The apparatus includes a voltage detecting system (1) for measuring a supply voltage (Vs) of the engine starter, a voltage waveform information detecting system (11) for detecting at least one of frequency information and amplitude information of a waveform representing variation of the supply voltage (Vs) as voltage waveform information (T), an a conduction time control system (12, 12A) for controlling a conduction time period of the engine starter in accordance with the voltage waveform information (T).

25 Claims, 5 Drawing Sheets

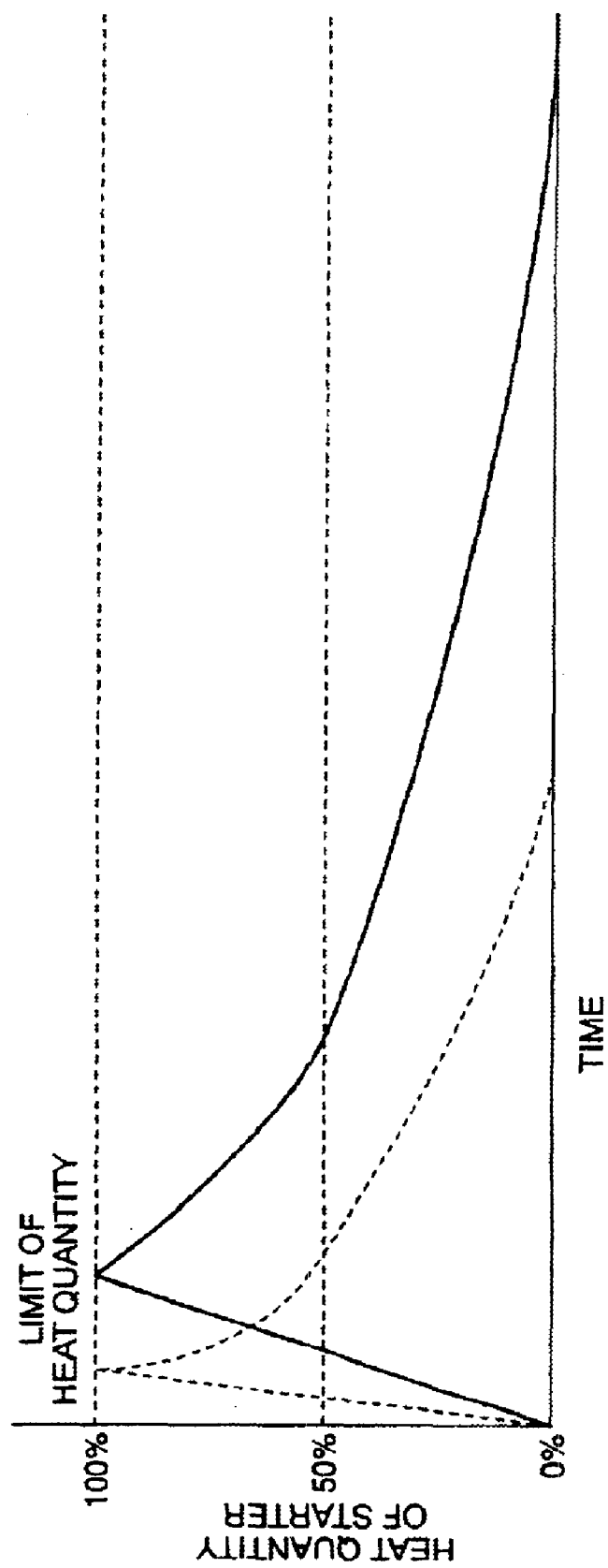

APPARATUS AND METHOD FOR PROTECTING STARTER FOR ENGINE AGAINST OVERHEATING

BACKGROUND OF THE INVENTION

1. Field of the Invention

The present invention relates generally to a method and apparatus for controlling a starter which is used for starting operation of an engine such as, for example, an internal combustion engine for a motor vehicle, an automobile or the like. More particularly, the present invention is concerned with a method and an apparatus for protecting the starter (hereinafter also referred to as the engine starter) against overheating upon starting of the engine operation.

2. Description of Related Art

In general, upon starting operation of the engine for a motor vehicle which may be an internal combustion engine or other, the engine starter is manually controlled through manipulation of a key switch by a user or driver. In this conjunction, it is noted that when the engine can not be started due to some malfunction of the engine itself or the key switch, there may unwantedly occur such situation that the starter rated ordinarily for a short-time operation is driven for an extended time, as a result of which the starter is subjected to an excessively large heat load.

Under the circumstances, there have been proposed a variety of apparatuses for preventing the starter from being subjected to an excessively large heat load. By way of example, there may be mentioned an apparatus for controlling conduction (electrical energization) of the starter with the aid of a timer circuit, as is disclosed in a Japanese Patent Application Laid-Open Publication No. 205092/2000 (JP-A-12-205092), an apparatus in which bimetal is employed as a member constituting a heat generating part (e.g. brush) of the starter and others.

In general, the conducting current of the starter is large when the temperature of the engine is low while the former assumes a small value when the temperature of the engine is high. Consequently, the quantity of heat generated by the starter is large when the temperature is low while it is small when the temperature is high. Accordingly, the conduction time period (the time duration of electrical energization) of the starter should preferably be altered or modified in dependence on the temperature.

However, when the conduction control or power supply control of the starter is carried out by using only the timer circuit, as in the case of the hitherto known apparatuses mentioned above, it is impossible to modify or change the conduction time period of the starter in dependence on the temperature of the engine and the conducting current (starter current). For this reason, such measures are taken that priority is imparted to the starter protecting function under the most severe conditions (e.g. cold engine state) by setting the conduction time period to be relatively short.

Accordingly, at a room temperature or a higher temperature, the conduction (i.e., electrical energization) of the starter will undesirably be interrupted earlier than the appropriate time point.

Besides, even when the conduction time period is modified or changed by taking into account the ambient temperature of the starter (or temperature of the engine cooling water), difficulty will still be encountered in determining the conduction time period of the starter because the heat generation state of the starter will change in accompanying the change of the wiring and the battery.

In addition, when the starter is to be employed for coping with abnormal situation such as moving of the motor vehicle whose engine suffers malfunction by making use of the output torque of the starter, the conduction time control may possibly be uncompetent therefor.

On the other hand, in the case of the conventional apparatus in which bimetals are employed as the members constituting the heat generating or radiating parts of the starter, it is difficult to use the bimetal in all the types of the starters because of spatial limitation of the bimetal mounting locations which may differ from one type of starter to another. Even if the use of the bimetal is permissible, complexity will be involved in the structure of the starter.

As is apparent from the foregoing, in the conventional method and apparatus for protecting the engine starter of the motor vehicle against overheating, the conduction time period of the starter is controlled by using only the timer circuit, and thus it is impossible to regulate or modify the conduction time period by taking into account the various conditions such as the ambient and starter temperatures and others. For this reason, priority is allocated to the starter protecting function by setting the conduction time period to be shorter than the rated time, as a result of which the conduction of the starter (power supply to the starter, to say in another way) is interrupted too early, giving rise to a problem.

Further, even in the apparatus capable of changing or altering the conducting or conduction time of the starter in dependence on the ambient temperature and others, the heat generation or radiation status changes when the battery and the wiring have been changed, making it difficult to determine appropriately the conduction time of the starter (i.e., the time period of the power supply to the starter), incurring another problem.

Furthermore, in the conventional apparatus in which bimetals are employed as the members constituting the heat radiating or generating part(s) of the starter, there exist problems such as spacial limitation of the bimetal mounting location(s), increased complexity of the starter structure and others.

SUMMARY OF THE INVENTION

In the light of the state of the art described above, it is an object of the present invention to solve the problems of the conventional techniques described above and provide a method and an apparatus for protecting an engine starter of a motor vehicle against overheating with enhanced reliability by controlling turn-on/off (electrical energization/ energization) of the starter in dependence on the conducting current of the starter (current flowing through the starter), the starter temperature and the ambient temperature.

Another object of the present invention is to provide a method and an apparatus for protecting an engine starter of a motor vehicle against overheating which can recognize discriminatively a locked state of the starter and an overrun state of the starter.

In view of the above and other objects which will become apparent as the description proceeds, there is provided according to a first aspect of the present invention an apparatus for protecting an engine starter against overheating, which apparatus includes a voltage detecting means for measuring a supply voltage of the engine starter, a voltage waveform information detecting means for detecting at least one of frequency information and amplitude information of a waveform representing variation of the supply voltage as voltage waveform information, and a conduction time control means for controlling a conduction time period of the engine starter in accordance with the voltage waveform information.

By virtue of the arrangement described above, there can be implemented the engine starter overheat protection apparatus which ensures enhanced reliability.

In a preferred mode for carrying out the present invention, the conduction time control means may be designed to hold the conduction time period of the engine starter within a predetermined time.

With the arrangement described above, the engine starter overheat protection apparatus can equally enjoy high reliability.

In another preferred mode for carrying out the invention, the conduction time control means may include a conduction inhibit control unit for controlling a conduction inhibited/disabled state of the engine starter so that upon breakage of power supply to the engine starter (i.e., conduction of the starter), the conduction inhibited/disabled state can be controlled in dependence on the voltage waveform information and the conduction time period effected immediately before the breakage.

Owing to the arrangement described above, operation reliability of the engine starter overheat protection apparatus can further be enhanced.

In yet another preferred mode for carrying out the present invention, the overheat protecting apparatus for an engine starter may further include a temperature sensor for measuring an ambient temperature of the engine starter and a starter temperature, wherein the conduction inhibit control unit may be so designed as to modify a conduction-inhibited time period on the basis of the ambient temperature and the starter temperature.

With the arrangement described above, operation reliability of the engine starter overheat protection apparatus can further be enhanced.

In still another preferred mode for carrying out the present invention, the conduction time control means may be designed to cooperate with the conduction inhibit control unit to thereby disable forcibly power supply to the starter at a time point when the voltage waveform information has no more been detected.

Owing to the arrangement mentioned above, not only the operation reliability of the overheat protecting apparatus can be enhanced but also the locked state of the starter and the overrun state thereof can be detected as well.

In a further preferred mode for carrying out the present invention, the overheat protecting apparatus for an engine starter may further include a key switch for generating a manipulation signal upon occurrence of an emergency starter operation demand, wherein the conduction inhibit control unit may be so designed as to reset the conduction inhibited/disabled state of the engine starter in response to the manipulation signal.

With the arrangement described above, there can be implemented the engine starter overheat protection apparatus which can ensure the safety for the starter.

Further, there is proposed according to a second aspect of the present invention, a method of protecting an engine starter against overheating by measuring a supply voltage for the engine starter. The method mentioned above includes a first step of detecting at least one of frequency information and amplitude information of a waveform representing variation of the supply voltage as voltage waveform information, and a second step of controlling a conduction time period of the engine starter in accordance with the voltage waveform information.

By virtue of the engine starter overheat protecting method described above, high reliability can be ensured for the protection of the starter against overheating.

In a mode for carrying out the method mentioned above, the conduction time period of the engine starter should preferably be held within a predetermined time.

Owing to the engine starter overheat protecting method described above, high operation reliability can be realized.

In another mode for carrying out the method described above, the second step should preferably include a third step of estimating a conducting current of the engine starter on the basis of the voltage waveform information, wherein the conduction time period of the engine starter may be controlled on the basis of an estimated value of the conducting current.

With the method mentioned above, high reliability can be realized for the protection of the starter.

In yet another mode for carrying out the present invention, the starter overheat protecting method should preferably include a fourth step of controlling the conduction inhibited/disabled state of the engine starter upon breakage of power supply to the engine starter in dependence on the voltage waveform information and the conduction time period effected immediately before the breakage.

With the method mentioned above, the reliability of the starter protection can be further be enhanced.

In still another mode for carrying out the present invention, the starter overheat protecting method may preferably further include a fifth step of measuring an ambient temperature of the engine starter and a starter temperature by means of a temperature sensor so that the conduction-inhibited time period can be modified on the basis of the ambient temperature and the starter temperature.

The method described above can ensure high reliability for the protection of the engine starter against overheating.

In a further mode for carrying out the present invention, in the fourth step mentioned above, power supply to the engine starter should preferably be forcibly disabled at a time point when the voltage waveform information has no more been detected.

With the method described above, not only the reliability of the overheat protection can be enhanced but also the locked state of the starter and the overrun state thereof can be detected as well.

In a yet further mode for carrying out the method mentioned above, the conduction inhibited/disabled state of the engine starter may preferably be reset in response to a manipulation signal of a key switch upon occurrence of an emergency operation demand.

With the method described above, there can be realized the engine starter overheat protection which can ensure the safety for the starter.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 8 is a waveform diagram which shows time-dependent changes of the heat quantity of the engine starter for illustrating the engine starter overheat protecting method according to the second embodiment of the present invention.

DESCRIPTION OF THE PREFERRED EMBODIMENTS

Figure 1:
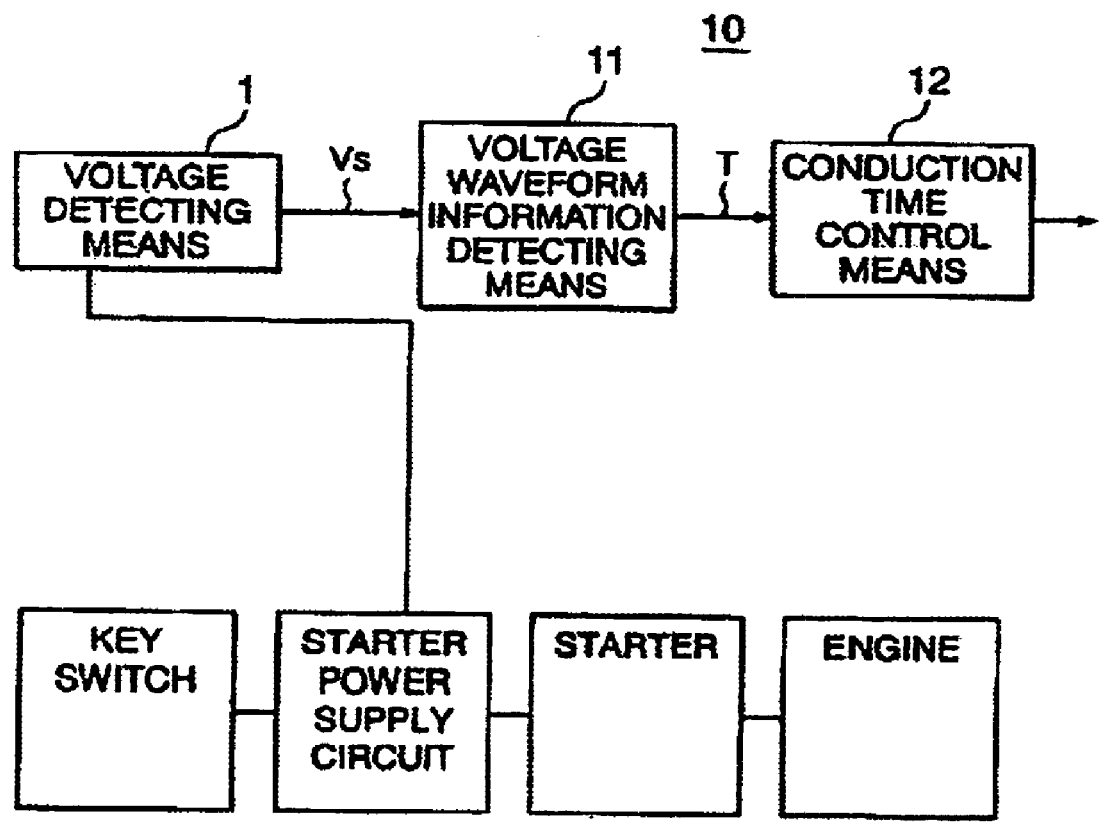
FIG. 1 is a block diagram showing generally and schematically a structure of an apparatus for protecting an engine starter against overheating according to a first embodiment of the present invention.

The present invention will be described in detail in conjunction with what is presently considered as preferred or typical embodiments thereof by reference to the drawings on the presumption that the present invention is applied to protection of the starter of an engine such as an internal combustion engine of a motor vehicle, being understood that the invention is never limited to any particular engine of a motor vehicle but can find application to a variety of engines. In the following description, like reference characters designate like or corresponding parts throughout the several views.

Embodiment 1

FIG. 1 is a block diagram showing generally and schematically a structure of an overheat protecting apparatus for an engine starter (also referred to as the starter overheat protecting apparatus) of a motor vehicle according to a first embodiment of the present invention.

Referring to FIG. 1, the engine starter overheat protecting apparatus according to the first embodiment of the present invention includes a voltage detecting means 1 which is provided in association with a starter power supply circuit (not shown) and which is designed for measuring a starter supply voltage Vs (hereinafter also referred to simply as the supply voltage). The output signal of the voltage detecting means 1 is inputted to an electronic control unit 10 or ECU 10 for short which may be constituted by a microcomputer or microprocessor.

The ECU 10 includes a voltage waveform information detecting means 11 and a conduction time control means 12.

The voltage waveform information detecting means 11 is designed to detect at least one of frequency information and amplitude information of a waveform representing variation or change of the starter supply voltage Vs as the voltage waveform information T. The waveform will also be referred to as the supply voltage waveform.

In the description which follows, it is presumed that both the frequency and the amplitude of the supply voltage waveform are detected.

The conduction time control means 12 is designed to control the conduction time period of the starter (i.e., the time duration over which the starter is electrically energized) in accordance with the voltage waveform information T for holding the conduction time period of the starter within a predetermined time.

Figure 2:
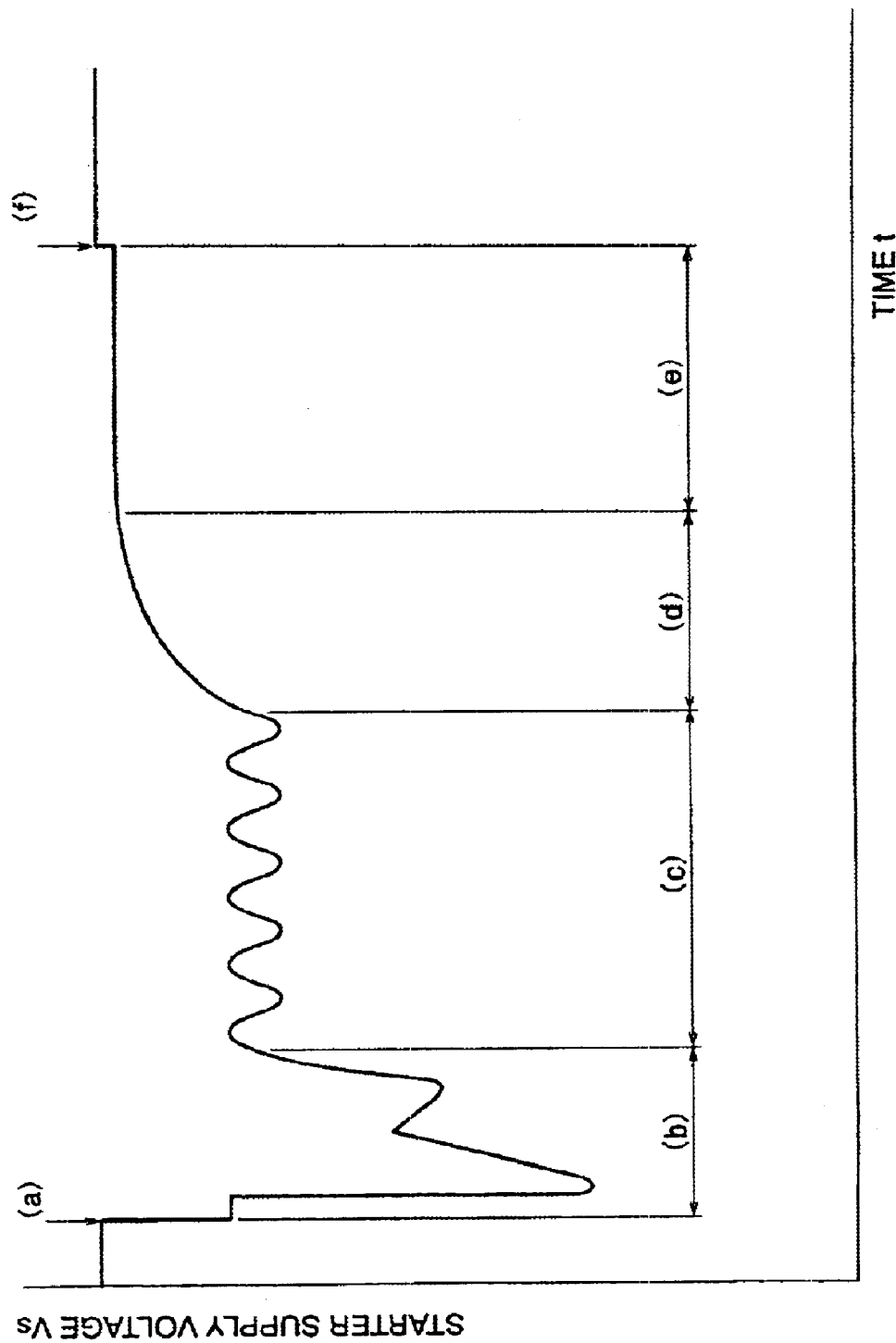
FIG. 2 is a waveform diagram for illustrating a time-dependent change behavior of a starter supply voltage in the overheat protecting apparatus for the engine starter according to the first embodiment of the present invention.

Next, referring to FIGS. 2 to 8, description will be made of operation of the starter overheat protecting apparatus according to the first embodiment of the present invention shown in FIG. 1. FIG. 2 is a waveform diagram showing a behavior of the starter supply voltage Vs which can be observed in general upon starting of the engine operation. In FIG. 2, the time is taken along the abscissa while the starter supply voltage Vs is taken along the ordinate. More specifically, illustrated in FIG. 2 are changes of the starter supply voltage Vs in intervals or subperiods (b) to (e) intervening between a starter-on time point (a) and a starter-off time point (f).

In the following, the behavior in general of the starter supply voltage Vs will be elucidated by reference to FIG. 2.

When a user or driver manipulates a key switch to a starter-on position at the starter-on time point (a), a starter magnet switch is closed. As a result of this, a large current (rush current) flows instantaneously through the starter. Consequently, the starter supply voltage Vs lowers rapidly and steeply at the starter-on time point (a), as can be seen in the figure.

In the succeeding interval or subperiod (b), a pinion gear of the starter is caused to mesh with a ring gear of the engine as a result of closing of the starter magnet switch, whereon a motor shaft of the starter starts to rotate. Consequently, the current fed to the starter diminishes gradually while the starter supply voltage Vs increases correspondingly.

When the state in which engine is rotated by the starter (i.e., cranking state) is reached during the interval or subperiod (c), engine torque will change in correspondence to the compression stroke and the expansion stroke, as a result of which waveform of the starter supply voltage Vs changes periodically similarly to the change of the engine torque.

When the engine operation is started in the interval or subperiod (d), the load imposed on the starter decreases owing to the torque generated by the engine, which results in that the starter supply voltage Vs increases.

Thereafter, when the state in which the pinion gear of the starter meshes with the ring gear of the engine remains as it is regardless of the engine operation having been started (this state is referred to as the overrun state), the starter assumes no-load state (i.e., the state in which the starter is subjected to no load). As a result, the starter supply voltage Vs becomes constant.

Finally, when the key switch is set to the starter-off position in the interval or subperiod (f), the power supply to the starter is interrupted, whereby the starter supply voltage Vs is restored to the initial value or level prevailed before the engine starting operation described above has been initiated.

The ECU 10 of the engine starter overheat protecting apparatus according to the present invention is so designed or programmed as to estimate the conducting current of the starter on the basis of the voltage waveform information T of the starter supply voltage Vs in the interval or subperiod (c) shown in FIG. 2 (i.e., in the state where the engine cranking is being carried out) for controlling the conduction time period on the basis of the estimated value of the conducting current of the starter to thereby preventing excessively large heat load from being applied to the starter.

Figure 3:
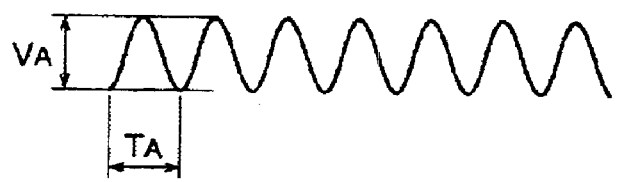
FIG. 3 is a waveform diagram which shows a time-dependent change of the starter supply voltage for illustrating a method of protecting the engine starter against overheating according to the first embodiment of the present invention.
Figure 4:
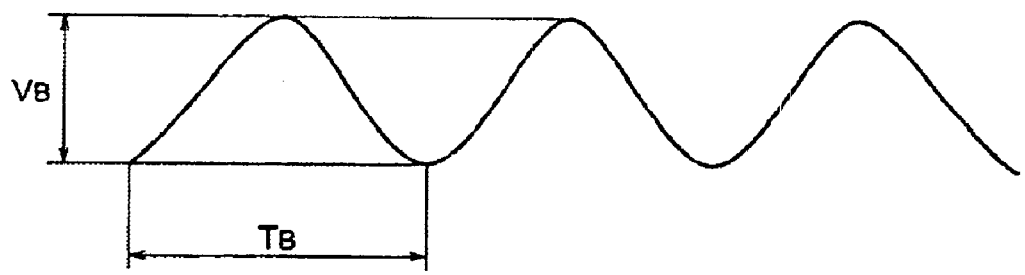
FIG. 4 is a waveform diagram which shows a time-dependent change of the starter supply voltage for illustrating a method of protecting the engine starter against overheating according to the first embodiment of the present invention.

FIGS. 3 and 4 are waveform diagrams showing, respectively, time-dependent changes (i.e., change as a function of time lapse) of the starter supply voltage Vs in the engine cranking operation. More specifically, FIG. 3 shows the voltage waveform in the case where the temperature of the engine cooling water (ambient temperature) is high (or engine load is small). As can be seen in the figure, the period TA of the voltage waveform is relatively short with the amplitude VA of the voltage waveform of the voltage waveform being also relatively small, although DC current component of the supply voltage Vs is large.

On the other hand, FIG. 4 shows the waveform in the case where the ambient temperature is low (or engine load is large). As can be seen in the figure, although the DC current component of the supply voltage Vs is small, the period TB of the voltage waveform is long with the amplitude VB of the voltage waveform of the voltage waveform being large, when compared with those shown in FIG. 3.

In general, when the conducting current of the starter is small (e.g. when the ambient temperature of the engine is high or the engine load is small) in the interval or subperiod (c) shown in FIG. 2 (i.e., in the engine cranking state) as in the case of FIG. 3, the starter supply voltage Vs becomes high while the voltage waveform information T (i.e., the period information and the amplitude information) diminishes.

On the contrary, when the conducting current of the starter is large (e.g. when the ambient temperature of the engine is low or the engine load is large), as in the case of example shown in FIG. 4, the starter supply voltage Vs becomes low while the voltage waveform information T assumes a large value.

Accordingly, with the measurement only of the starter supply voltage Vs, it is difficult to estimate accurately the conducting current of the starter because of significant variance of the starter supply voltage as described above. However, by additionally detecting or measuring the voltage waveform information T as shown in FIG. 1, the conducting current of the starter can be estimated with high accuracy.

Ordinarily, heat generation of the starter remains low when the conduction current is small. In that case, the conduction time period may be set relatively long. However, in the case where the conducting current is large, the quantity of heat generated by the starter is also large. Accordingly, in this case, it is necessary to set the conduction time period to be relatively short with a view to protecting the starter against thermal damage.

For the reasons described above, the conduction time control means 12 incorporated in the ECU 10 should be so designed as to set the conduction time period of the starter to be long when the voltage waveform information T of the starter supply voltage Vs is of a small value while setting short the conduction time period of the starter when the voltage waveform information T is of a large value, to thereby protect the starter against the thermal damage with high reliability.

In this way, according to the teachings of the invention incarnated in the instant embodiment of the invention, the on/off control of the starter can be performed in dependence on the accurately estimated value of the conducting current of the starter and the ambient temperature, whereby the reliability of the overheat preventing or protecting function can significantly be enhanced.

Embodiment 2

In the foregoing description of the apparatus for protecting the engine starter against overheating according to the first embodiment of the invention, no consideration has been paid in particular to the temperature of the starter. A second embodiment of the present invention is directed to the starter overheat protecting apparatus which is arranged such that the starter temperature can be reflected in the conduction control (i.e., in the overheat protection) of the starter.

In the following, referring to FIGS. 5 to 8, description will be made of the engine starter overheat protecting method and apparatus in which the starter temperature is taken into account for the conduction control.

Figure 5:
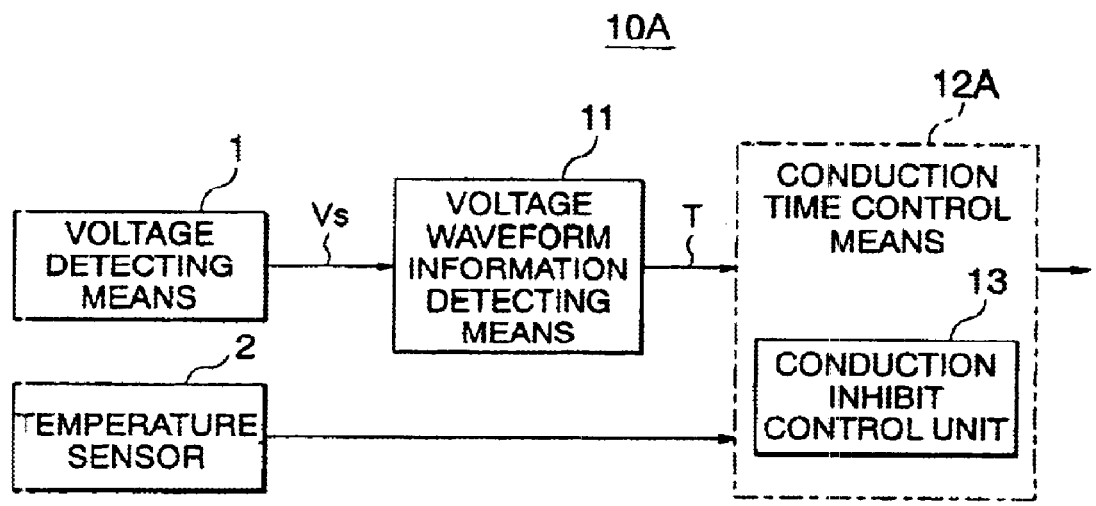
FIG. 5 is a block diagram showing generally and schematically a structure of an apparatus for protecting an engine starter against overheating according to a second embodiment of the present invention.

FIG. 5 is a block diagram showing generally and schematically a structure of the engine starter overheat protecting apparatus according to the second embodiment of the present invention. In the figure, like components as those described hereinbefore by reference to FIG. 1 are denoted by like reference symbols, being affixed with "A" as the case may be, and repeated description in detail thereof is omitted.

Referring to FIG. 5, a temperature sensor 2 which may be constituted by a thermistor or the like which is disposed in the vicinity of the starter for measuring the starter temperature. The output signal of the temperature sensor is inputted to the ECU 10. The temperature sensor 2 may be incorporated in, for example, a starter control circuit built in the starter or alternatively be directly mounted on the starter.

Parenthetically, although the ambient temperature of the starter can be determined on the basis of the temperature of the engine cooling water as described previously, it is equally possible to detect the ambient temperature of the starter directly by means of the temperature sensor 2 as well.

The key switch (not shown) for driving the starter is provided for generating an manipulation signal upon occurrence of an emergency operation demand.

A conduction time control means 12A incorporated in the ECU 10A includes a conduction inhibit control unit 13 for controlling the conduction inhibited/disabled state of the starter. The conduction time control means 12A cooperates with the conduction inhibit control unit 13 to control the conduction inhibited/disabled state for the starter upon breakage of the power supply to the starter in dependence on the voltage waveform information T and the conduction time period effected immediately before the breakage.

The conduction inhibit control unit 13 is designed such that at the time point when the voltage waveform information T has no more been detected, electric energization or conduction of the starter is forcibly inhibited or disabled while the conduction-inhibited time period is changed in dependence on the ambient temperature and the starter temperature.

Furthermore, the conduction inhibit control unit 13 is designed to reset the conduction inhibited/disabled state for the starter in response to the manipulation signal issued by the key switch (not shown) upon occurrence of an emergency starter conduction demand.

Figure 6:
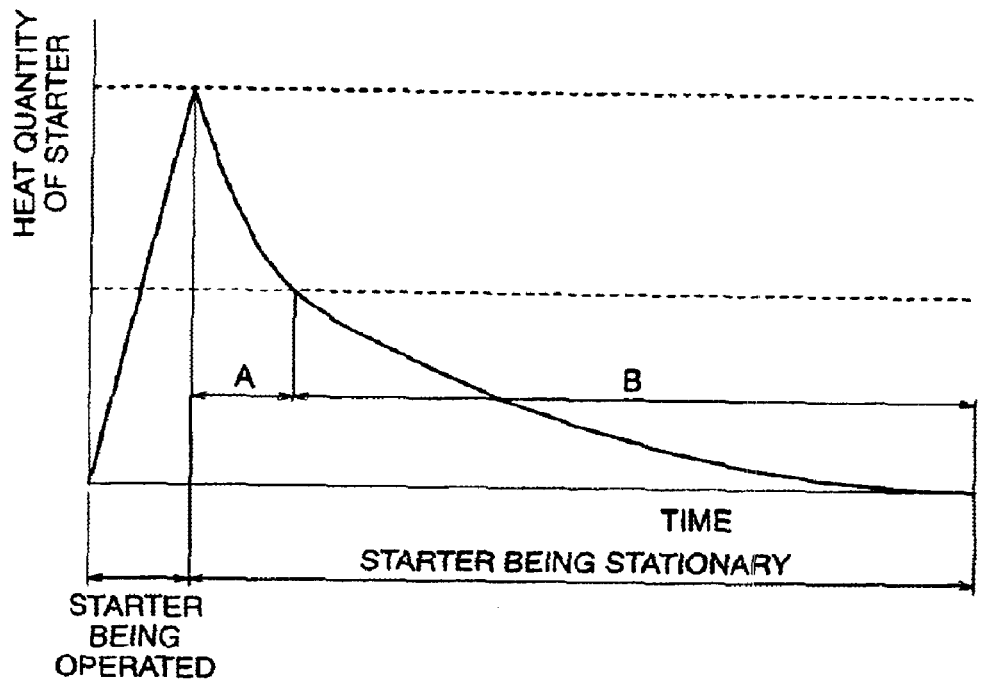
FIG. 6 is a waveform diagram which shows a time-dependent change of heat quantity of an engine starter for illustrating the engine starter overheat protecting method according to the second embodiment of the present invention.

FIG. 6 is a waveform diagram showing change of the heat quantity of the starter as a function of time lapse when heat generation and heat dissipation of the starter take place. As can be seen in FIG. 6, the heat quantity of the starter increases approximately linearly so far as the starter is operating while it decreases under heat dissipation when the starter is stationary.

At this juncture, it should also be added that in the interval or subperiod A (FIG. 6) during which the starter temperature is high, the heat dissipation takes place at a high rate while in the interval or subperiod B (FIG. 6) where the starter temperature is low, the heat dissipation rate becomes low. In that case, when the quantity of heat generated by the starter has reached a limit of heat quantity (limit of the heat capacitance) of the starter, the starter is forcibly turned off (or electrically deenergized).

Figure 7:
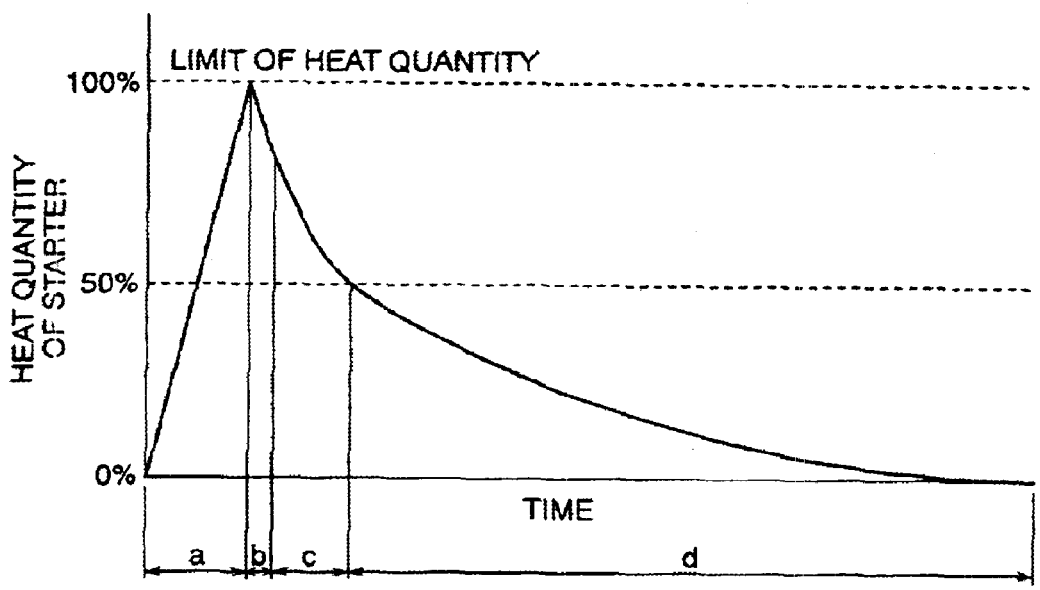
FIG. 7 is a waveform diagram which shows a time-dependent change of heat quantity of the engine starter for illustrating the engine starter overheat protecting method according to the second embodiment of the present invention.

FIG. 7 is a waveform diagram for illustrating the overheat protecting operation according to the second embodiment of the present invention. Referring to FIG. 7, the quantity of heat generated by the starter is determined on the basis of the estimated value of the conducting current of the starter mentioned hereinbefore. In the figure, an interval or subperiod a represents a period during which the starter can be operated from the initial state up to the limit of heat quantity (heat capacitance) of the starter, an interval or subperiod b represents a starter operation inhibited period validated from the time point when the limit of heat quantity (heat capacitance) of the starter has been reached, an interval or subperiod c represents a time period required for the heat quantity of the starter to decrease by 50% from the limit of heat quantity (heat capacitance) of the starter when the latter is represented by 100%, and an interval or subperiod d represents the time taken for the heat quantity of the starter to decrease to 0 (zero) %.

The heat dissipation (decrement of the heat quantity) of the starter is arithmetically determined on the basis of the ambient temperature and the starter temperature measured by the temperature sensor 2. Since the heat quantity of the starter decreases at a high rate when the ambient temperature is low, the decrement of the heat quantity is set to a large value. On the contrary, when the ambient temperature is high, the heat quantity of the starter decreases at a low rate. Accordingly, the decrement of the heat quantity is set to a small value.

In this way, every time the heat quantity is arithmetically determined, the ambient temperature is measured by means of the temperature sensor 2 to subtract the heat quantity comparable to the ambient temperature. In that case, since the heat dissipation of the starter is effected at an increased rate as the temperature difference between the ambient temperature and the starter temperature increases, subtraction of the heat quantity comparable to the heat dissipation is performed, as is shown, for example, in FIG. 7.

More specifically, until the heat quantity of the starter has decreased to 50%, the heat quantity decrement value is set to a large value, as shown in the interval or subperiod d, while after the heat quantity has decreased to or below 50%, the heat quantity decrement value is set to be small. In this manner, the overheat protection can be carried out with high accuracy and reliability.

FIG. 8 is a waveform diagram for illustrating time-dependent changes of the heat quantity of the starter at different ambient temperatures of the engine according to the second embodiment of the present invention. In the figure, the time-dependent change of the heat quantity of the starter when the ambient temperature of the engine is high (or when the engine load is low) is represented by a broken line curve, while the change of the heat quantity of the starter in the state where the ambient temperature of the engine is high (or the engine load is high) is represented by a solid line curve.

By determining the heat quantity decrement value in dependence on the ambient temperature of the starter (ambient temperature of the engine) and the starter temperature, enhanced reliability can be ensured for the overheat protection of the starter.

Incidentally, when the voltage waveform information T (period information and amplitude information) of the starter supply voltage Vs becomes unavailable in the interval or subperiod (c) shown in FIG. 2, this means that the starter is locked or alternatively the starter is rotated by the engine.

Accordingly, the conduction time control means 12A may be so designed or programmed that when the state in which the voltage waveform information T of the starter supply voltage Vs has disappeared is detected, the conduction time control means forcibly interrupts the conducting current of the starter (electrical energization of the starter) through cooperation with the conduction inhibit control unit 13 to thereby protect the starter against the thermal damage.

Furthermore, for coping with the emergency situation such as situation where the motor vehicle equipped with the starter protection system according to the invention must be moved away from, for example, a railroad crossing (occurrence of an emergency operation demand) in the state in which the starter is electrically disenergized or stopped, the conduction inhibit control unit 13 may be so designed as to disable the conduction inhibiting function (overheat protection function) in response to only the manipulation signal issued by the manipulation switch such as the key switch (not shown). In this manner, safety can be ensured for the motor vehicle. At this juncture, it should also be mentioned that no extra wiring or circuit is required for realizing the emergency coping function mentioned above.

Additionally, when the starter has been fallen in the locked state or overrun state, this state can be detected to thereby inhibit or disable the conduction (electrical energization) of the starter.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, although the present invention has been described on the presumption that the invention is applied to the overheat protection of the starter for the engine such as the internal combustion engine for a motor vehicle, it should be appreciated that the invention can find application to other types of engines whose operation is started with the aid of the starter. Accordingly, the term "engine" used herein should never be interpreted in the strict sense.

Accordingly, all suitable modifications and equivalents may be resorted to, falling within the spirit and scope of the invention.

What is claimed is:

1. An apparatus for protecting an engine starter against overheating, comprising:
    voltage detecting means for measuring a supply voltage of said engine starter;
    voltage waveform information detecting means for detecting at least one of frequency information and amplitude information of a waveform representing variation of said supply voltage as voltage waveform information; and
    conduction time control means for controlling a conduction time period of said engine starter in accordance with said voltage waveform information.

2. An overheat protecting apparatus for an engine starter according to claim 1,
    wherein said conduction time control means is designed to hold said conduction time period of said engine starter within a predetermined time.

3. An overheat protecting apparatus for an engine starter according to claim 1, said conduction time control means including:

a conduction inhibit control unit for controlling a conduction inhibited/disabled state of said engine starter, wherein upon breakage of power supply to said engine starter, said conduction inhibited/disabled state is controlled in dependence on said voltage waveform information and said conduction time period effected immediately before said breakage.

4. An overheat protecting apparatus for an engine starter according to claim 3, further comprising:

a temperature sensor for measuring an ambient temperature of said engine starter and a starter temperature, wherein said conduction inhibit control unit is designed to modify a conduction-inhibited time period on the basis of said ambient temperature and said starter temperature.

5. An overheat protecting apparatus for an engine starter according to claim 3, wherein said conduction time control means is designed to cooperate with said conduction inhibit control unit to thereby disable forcibly power supply to said starter at a time point when said voltage waveform information is no longer detected.

6. An overheat protecting apparatus for an engine starter according to claim 3, further comprising:

a key switch for generating a manipulation signal upon occurrence of an emergency starter operation demand, wherein said conduction inhibit control unit is designed to reset the conduction inhibited/disabled state of said engine starter in response to said manipulation signal.

7. A method of protecting an engine starter against overheating by measuring a supply voltage for said engine starter, comprising:

a first step of detecting at least one of frequency information and amplitude information of a waveform representing variation of said supply voltage as voltage waveform information; and a second step of controlling a conduction time period of said engine starter in accordance with said voltage waveform information.

8. A method of protecting an engine starter against overheating according to claim 7, wherein said conduction time period of said engine starter is held within a predetermined time.

9. A method of protecting an engine starter against overheating according to claim 7, said second step including:

a third step of estimating a conducting current of said engine starter on the basis of said voltage waveform information, wherein said conduction time period of said engine starter is controlled on the basis of an estimated value of said conducting current.

10. A method of protecting an engine starter against overheating according to claim 7, further comprising:

a fourth step of controlling said conduction inhibited/disabled state of said engine starter upon breakage of power supply to said engine starter in dependence on said voltage waveform information and said conduction time period effected immediately before said breakage.

11. A method of protecting an engine starter against overheating according to claim 10, further comprising:

a fifth step of measuring an ambient temperature of said engine starter and a starter temperature by means of a temperature sensor, wherein a conduction-inhibited time period is modified on the basis of said ambient temperature and said starter temperature.

12. A method of protecting an engine starter against overheating according to claim 10, wherein in said fourth step, power supply to said engine starter is forcibly disabled at a time point when said voltage waveform information is no longer detected.

13. A method of protecting an engine starter against overheating according to claim 10, wherein the conduction inhibited/disabled state of said engine starter is reset in response to a manipulation signal of a key switch upon occurrence of an emergency operation demand.

14. An overheat protecting apparatus for an engine starter according to claim 1, wherein the conduction time control means controls the conduction time period based upon the amplitude information of the waveform.

15. An overheat protecting apparatus for an engine starter according to claim 1, wherein the conduction time control means controls the conduction time period based upon the frequency information of the waveform.

16. An overheat protecting apparatus for an engine starter according to claim 1, wherein the waveform information is detected only during a time period between when said engine starter is engaged with an engine to start said engine and when said engine turns under its own power.

17. An overheat protecting apparatus for an engine starter according to claim 16, wherein said waveform information is dictated by the reciprocating strokes of the engine.

18. An overheat protecting apparatus for an engine starter according to claim 16, wherein:

when an ambient temperature of said engine is comparatively high, the amplitude information is comparatively low, the frequency information is comparatively short, and the engine starter is allowed to rotate for a comparatively longer time period; and when an ambient temperature of said engine is comparatively low, the amplitude information is comparatively high, the frequency information is comparatively long, and the engine starter is allowed to rotate for a comparatively shorter time period.

19. An overheat protecting apparatus for an engine starter according to claim 16, wherein the supply voltage of said engine starter is measured from a starter power supply circuit.

20. A method of protecting an engine starter against overheating according to claim 7, wherein said second step of controlling the conduction time period of said engine starter is performed with the amplitude information of the waveform.

21. A method of protecting an engine starter against overheating according to claim 7, wherein said second step of controlling the conduction time period of said engine starter is performed with the frequency information of the waveform.

22. A method of protecting an engine starter against overheating according to claim 7, wherein the waveform information is detected only during a time period between when said engine starter is engaged with an engine to start said engine and when said engine turns under its own power.

23. A method of protecting an engine starter against overheating according to claim 22, wherein said waveform information is dictated by the reciprocating strokes of the engine.

24. A method of protecting an engine starter against overheating according to claim 22, wherein:
when an ambient temperature of said engine is comparatively high, the amplitude information is comparatively low, the frequency information is comparatively short, and the engine starter is allowed to rotate for a comparatively longer time period; and
when an ambient temperature of said engine is comparatively low, the amplitude information is comparatively high, the frequency information is comparatively long, and the engine starter is allowed to rotate for a comparatively shorter time period.

25. A method of protecting an engine starter against overheating according to claim 22, wherein the supply voltage of said engine starter is measured from a starter power supply circuit.

* * * * *